United States Patent

Broussard et al.

[11] Patent Number: 5,949,214
[45] Date of Patent: Sep. 7, 1999

[54] RECHARGEABLE BATTERY PACK

[75] Inventors: Keith Broussard; Alan Sprain, both of Houston, Tex.

[73] Assignee: Input/Output, Inc., Stafford, Tex.

[21] Appl. No.: 08/964,055

[22] Filed: Nov. 4, 1997

[51] Int. Cl.$^6$ ........................................................ H02J 7/00
[52] U.S. Cl. ........................ 320/107; 320/113; 320/108; 320/112
[58] Field of Search ................................... 320/108, 107, 320/112, 113

[56] References Cited

U.S. PATENT DOCUMENTS

| | | | |
|---|---|---|---|
| 3,683,280 | 8/1972 | Holt | 43/9.6 |
| 3,840,795 | 10/1974 | Roszyk et al. | 320/108 |
| 4,288,733 | 9/1981 | Bilanceri et al. | |
| 4,556,837 | 12/1985 | Kobayashi et al. | 320/108 |
| 4,912,684 | 3/1990 | Fowler | 367/76 |
| 5,283,767 | 2/1994 | McCoy | |
| 5,329,071 | 7/1994 | Vatne et al. | |
| 5,367,242 | 11/1994 | Hulman | 320/108 |
| 5,525,888 | 6/1996 | Toya | 320/113 |
| 5,532,975 | 7/1996 | Elholm | |
| 5,550,452 | 8/1996 | Shirai et al. | 320/108 |
| 5,600,225 | 2/1997 | Goto | 320/108 |

*Primary Examiner*—Peter S. Wong
*Assistant Examiner*—K. Shin

[57] ABSTRACT

A battery charging apparatus and method permits the recharging of the batteries of a seismic streamer depth control device or bird without access to the interior of the bird. In a preferred embodiment, a battery pack includes a coil within the bird that is capable of receiving a charging field from a charging unit by inductive coupling. The coil provides power to a regulated power supply comprising a voltage regulator and rectifier, and direct current is provided to charge battery cells. Thus, the batteries within the bird a charged by induction from outside the casing of the bird. Alternatively, the battery pack may be detached from the rest of the bird, but the battery pack remains sealed against the elements. The battery pack may include an electrical connector which attaches to the main body of the bird, and the electrical connector includes one or more pins for charging purposes. When the battery pack is detached from the main body of the bird and placed in a storage rack, the electrical connector of the battery pack mates with an outlet and the battery pack is charged through the regulated power supply.

16 Claims, 2 Drawing Sheets

RECHARGEABLE BATTERY PACK

FIELD OF THE INVENTION

The present invention relates generally to the field of battery powered apparatus and, more particularly, to a method and apparatus for charging the batteries within the sealed housing of a depth control device for a hydrophone streamer.

BACKGROUND OF THE INVENTION

Offshore seismic systems today comprise relatively complex combinations of on-board systems and towed arrays. A towed array includes signal sources and receivers, as well as radio-telemetry systems, navigation systems, and other devices. For proper operation, the towed array must be closely maintained within a defined depth range, and the maintenance of this depth is most commonly accomplished with depth control devices attached to or coupled in-line with the array streamers. Such a depth control device is often referred to as a "bird".

A depth control device includes electronics which require a specific voltage of electrical power, generally 3 $V_{DC}$, as well as a motor for driving depth control planes or wings, which requires a different voltage, generally 6 $V_{DC}$, for proper operation. In current seismic streamer systems, these voltages are provided by a battery pack with 3 and 6 volt battery cells. With use, the battery packs are drained and require replacement with fresh battery packs. To accomplish this, the streamer is reeled in, the depth control device is removed from the streamer and opened up to remove the expended battery pack and to place a fresh battery pack in its place.

Unfortunately, opening up the bird exposes its internal electronics to the deleterious effects of salt-laden air. Also, even if the battery pack is replaced in a carefully controlled environment, after the fresh battery pack is installed the access cover to the battery pack compartment may not be properly sealed and may consequently leak when the bird is re-deployed.

Furthermore, even if the interior of the bird is not exposed to salty air and does not leak when re-submerged, the process of removing, recharging, and replacing a battery pack is labor intensive and time consuming. Any such activities on board seismic vessels increases the time and cost of the seismic exploration and is therefore to be avoided or reduced, if possible.

Thus, there remains a need for a rechargeable or replaceable battery pack for a depth control device. Such a battery pack may be rechargeable with the entire bird assembled where the recharging operation takes place when the bird is stored in a storage rack between seismic exploration operations. Alternatively, the battery pack may be detached from the main body of the bird, without the need for access to the interior of the bird. The battery pack may then be placed in a storage rack and recharged while the battery pack is in storage. While the detached battery pack is being charged in the storage rack, replacement battery packs are installed in the birds and the seismic streamers are deployed for the continuation of seismic exploration operations without delay.

SUMMARY OF THE INVENTION

The battery pack of the present invention addresses these and other drawbacks of the prior art by providing an apparatus and a method for maintaining the charge on the batteries of a bird without the need for access to the interior of the bird. In a preferred embodiment, the battery pack includes a coil within the bird that is capable of receiving a charging field from a charging unit. The coil provides power to a voltage regulator and rectifier, and direct current is provided to charge battery cells. Thus, the batteries within the bird are charged by induction from outside the casing of the bird.

In an alternative embodiment, the battery pack may be detached from the rest of the bird, but the battery pack remains sealed against the elements. The battery pack includes an endcap connector assembly which plugs into the main body of the bird, and the endcap connector includes one or more pins for battery charging purposes. When the battery pack is detached from the main body of the bird and placed in a storage rack, the electrical endcap connector of the battery pack mates with an outlet on the storage rack and the battery pack is charged through the regulated power supply within the battery pack. Alternatively, a plurality of pins in the endcap connector may be included to provide a number of regulated current sources to charge the battery cells of different voltages.

These and other features of the present invention will be apparent to those of skill in the art from a review of the following detailed description along with the accompanying drawings.

DETAILED DESCRIPTION OF A PREFERRED EMBODIMENT

Figure 1:
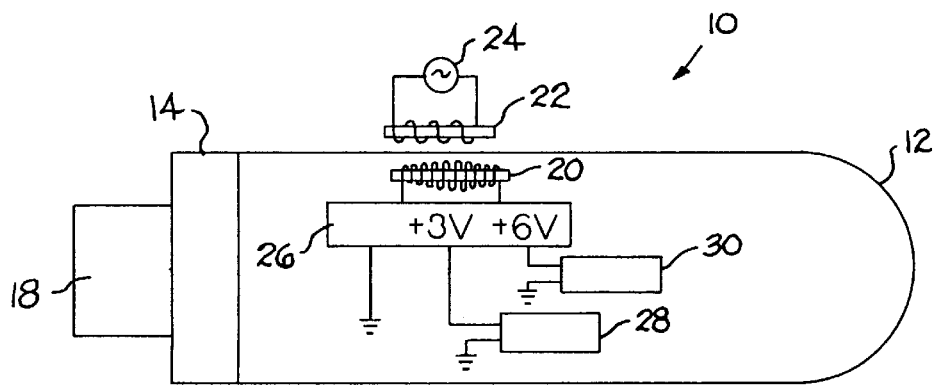
FIG. 1 is a schematic diagram of a battery pick module of the present invention and the circuitry within for inductive recharging of battery cells.

FIG. 1 depicts a rechargeable battery system 10 in accordance with the present invention. The system 10 comprises a battery module 12 defined by an enclosed, water-tight shell and an endcap or connector assembly 14, whereby the battery module 12 attaches to the main body of a depth control device 16 (see FIG. 2). The depth control device 16 includes a pair of depth control planes or wings 17. The connector assembly 14 includes a plug 18 which includes a plurality of pins (not shown) for carrying power from the battery module 12 to various electrical and electronic components within the main body of the depth control device 16.

Figure 2:
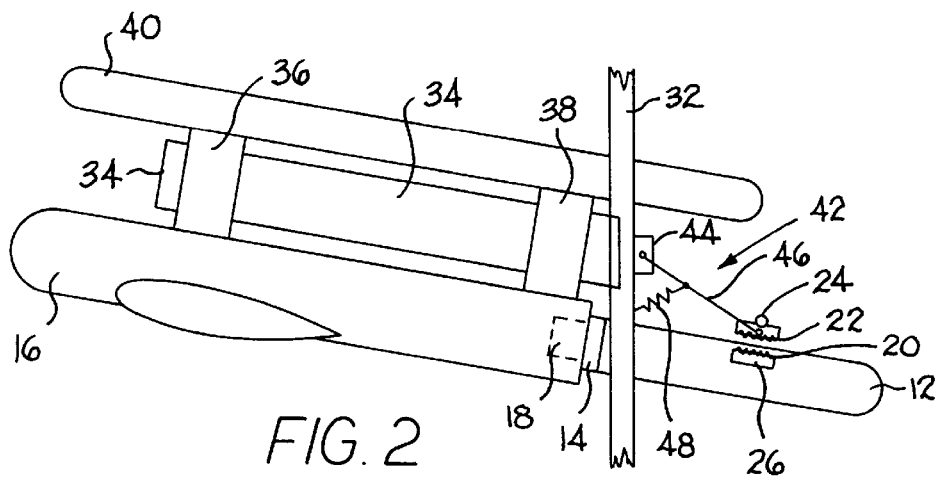
FIG. 2 is a side view of a storage rack with an inductive battery charger charging a battery pack coupled to a depth control device.

It should be understood that the battery module has been described as attached to the main body, but the battery portion may be constructed as an integral portion of the depth control device, and not detachable, as shown in FIGS. 1 and 2.

The battery module 12 further comprises a secondary or receiving coil 20 which is magnetically coupled to a primary or charging coil 22 during charging operations. A voltage supply 24, such as a standard voltage source, provides current to the primary coil 22. The secondary coil, preferably embedded within a potting material in the battery module 12, receives the field developed by the primary coil 22, to generate an input voltage to a regulated power supply 26. The power supply 26 develops the various voltages for charging a plurality of battery cells 28 and 30, such as 3 $V_{DC}$ and 6 $V_{DC}$, as shown in FIG. 1.

FIG. 2 depicts a setup for inductively charging the battery cells 28 and 30. In this embodiment, the battery module 12 remains attached to the depth control device 16; that is, the plug 18 remains inserted into the main body of the depth control device. This arrangement includes a storage rack 32 to receive and store a number of birds for storage and recharging. Extending from the storage rack is a cantilevered support post 34. It should be understood that the storage system includes many of such support posts, in order to store a large number of birds. The support post 34 receives a forward collar 36 and an after collar 38, which extend from the main body of the bird 16. The depth control device may optionally include a streamer retrieval unit 40, and consequently this unit 40 must also be accommodated by the storage rack 32.

Mounted on the back of the storage rack is a charger 42. The charger comprises a fulcrum 44, an extension arm 46, and a primary coil 22, which is powered by a power source 24. While the power source 24 is shown schematically in FIG. 2, the wiring for the power source to primary winding connection may be incorporated into the storage rack design.

The extension arm is spring loaded by a biasing means 48 of any appropriate type, so long as it maintains the primary coil close to or against the skin of the battery module 12, so that the magnetic field generated by the primary coil is coupled to the secondary coil 20 within the module 12 to the maximum extent possible.

Figure 3:
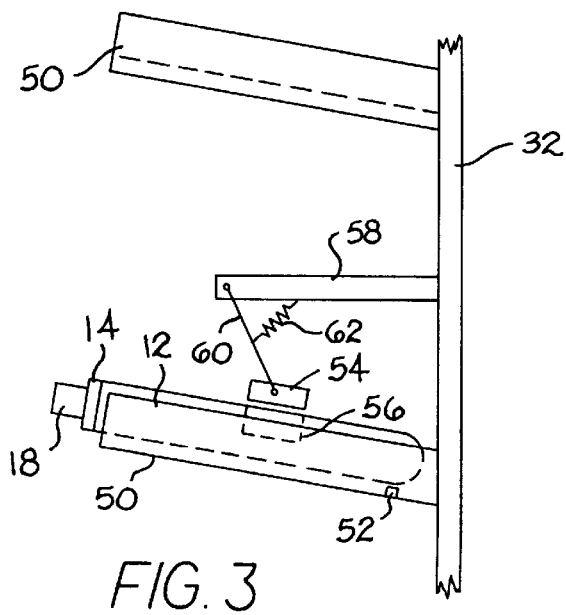
FIG. 3 is a side view of a storage rack with an inductive battery charger charging a battery pack detached from a depth control device.

FIG. 3 depicts another embodiment for a charging rack within the scope of the present invention. In this embodiment, the battery module 12 is removed from the main body 16 of the bird for recharging. It should be noted, however, that the battery module is recharged in this case, as before, without access to the interior of the bird.

In the embodiment of FIG. 3, the support rack 32 includes a number of support chutes 50 projecting from the rack 32 at a slight angle. With this arrangement, gravity urges the battery module 12 supported within the chute toward the rack 32 for secure storage. With the battery module 12 placed in the chute 50, the module lines up with an alignment device such as an alignment pin 52, or other appropriate mechanism. This setup aligns a charger primary 54 with an associated charger secondary 56 within the battery module.

The charger primary 54 is supported by a support arm 58 and a moveable extension arm 60. The extension arm 60 and the attached charger primary 54 are biased toward the battery module 12 by a biasing means such as a spring 62. This action maintains the charger primary 54 as close a possible to the battery coil or charger secondary 56, as previously described.

Figure 4:
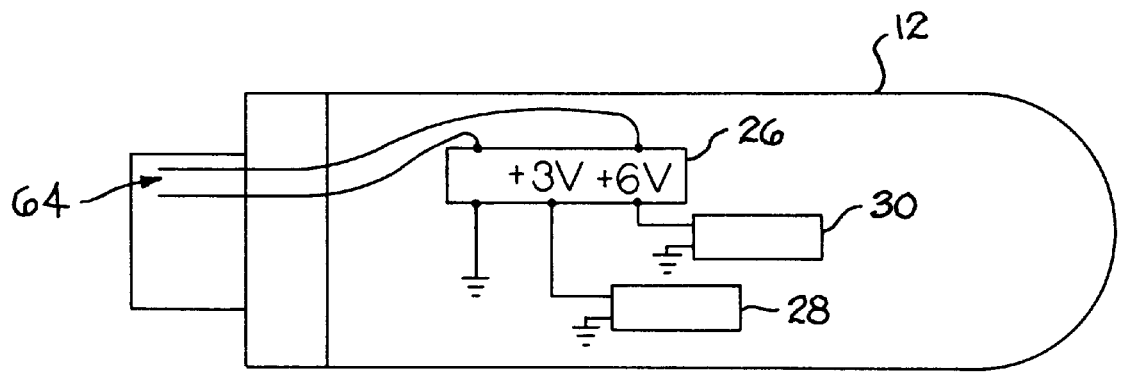
FIG. 4 is a schematic diagram of a battery pack module of the present invention and the circuitry within for charging battery cells through a pin connection on an end-cap connector.
Figure 5:
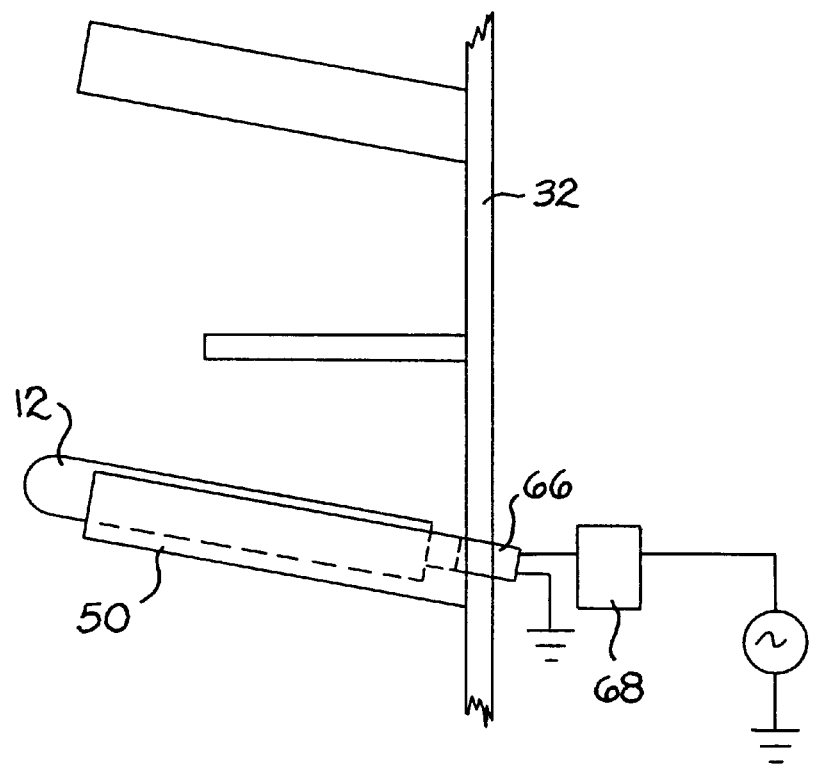
FIG. 5 is a side view of a storage rack with an electrically coupled battery charger charging a battery pack detached from a depth control device.

FIGS. 4 and 5 depict another embodiment of the battery module charging system and charging rack of the present invention. In this case, the battery module 12 includes one or more charging pins 64 to provide charging power to the regulated power supply 26. The power supply 26 develops the various voltage for charging a plurality of battery cells 28 and 30, such as 3 $V_{DC}$ and 6 $V_{DC}$, as previously described.

The rack 32 has a configuration similar to that shown in FIG. 3. However, in this case, the battery module 12 is placed in the support chute with the pins 64 toward the rack. The pins 64 are then plugged into a receptacle 66 for storage and the recharging of the cells within the battery module. Power is provided to the receptacle 66 from a standard power supply, such as for example a 110 $V_{AC}$ ship's power supply. The power may also be provided through a distribution box 68, which may provide rectification, filtering, and regulation, if desired, so that a low voltage, regulated DC power supply is provided at the receptacle 66.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A rechargeable battery module for a depth control device, the module comprising:
   a. a first battery cell;
   b. a regulated power supply coupled to the battery cell and capable of developing one or more regulated charging voltages;
   c. a coil which serves as the secondary coil of a recharging transformer; and
   d. a water-tight shell around the battery cell, the power supply, and the coil.

2. The battery module of claim 1 further comprising a connector assembly for attaching, the battery module to a depth control device.

3. The battery module of claim 1, wherein the module is formed as an integral part of the depth control device.

4. The battery module of claim 1, further comprising a second battery cell, and wherein the first and second battery cells maintain different voltage potentials.

5. A system for charging a battery module for a depth control device, the system comprising:
   a. a rack adapted to receive a depth control device with a battery module mounted thereon;
   b. a charging coil coupled to the rack;
   c. a receiving coil sealed within a water-tight shell of the battery module;
   d. a power supply electrically coupled to the receiving coil;
   e. a battery cell charged from the power supply; and
   f. an extension arm for coupling the charging coil to the rack.

6. The system of claim 5, wherein the power supply is a regulated power supply capable of developing one or more regulated charging voltages.

7. The system of claim 5, further comprising a biasing means on the extension arm to bias the charging coil toward the receiving coil.

8. The system of claim 5 further comprising a support post extending from the rack to support the depth control device.

9. A system for charging a battery module for a depth control device, the system comprising:
   a. a rack adapted to receive a battery module detached from a depth control device;
   b. a charging coil coupled to the rack;
   c. a receiving coil sealed within a water-tight shell of the battery module;
   d. a power supply electrically coupled to the receiving coil;

e. a battery cell charged from the power supply; and f. alignment means for aligning the charging coil with the receiving coil.

10. The system of claim 9, further comprising a support chute projecting from the rack to support the battery module.

11. The system of claim 9, further comprising an extension arm for coupling the charging coil to the rack.

12. The system of claim 11, further comprising a biasing means on the extension arm to bias the charging coil toward the receiving coil.

13. The system of claim 9 wherein the alignment means comprises an alignment pin.

14. A rechargeable battery module for a depth control device, the module comprising:

a. a first battery cell;

b. a regulated power supply coupled to the battery cell and capable of developing one or more regulated charging voltages;

c. a water-tight shell around the battery cell and the power supply; and d. an electrical coupling through the water-tight shell to provide an electrical current path through the water-tight shell to the regulated power supply.

15. A system for charging a battery module for a depth control device, the system comprising:

a. a rack adapted to receive a battery module of a depth control device, the battery module including a water-tight shell encapsulating at least one battery cell;

b. a receptacle on the rack for receiving an electrical connector on the battery module;

c. a power supply electrically coupled to the receptacle; and d. a support chute projecting from the rack to support the battery module.

16. The system of claim 15, further comprising a regulated power supply coupled to the battery cell.

* * * * *